Figure 1:
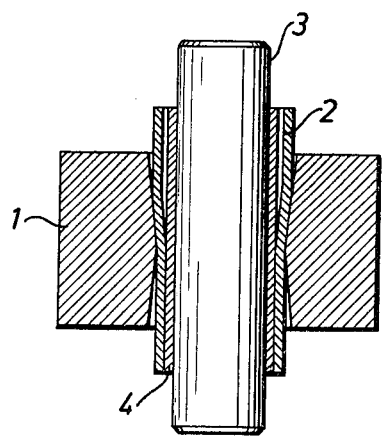

United States Patent
Waage

[15] 3,639,960
[45] Feb. 8, 1972

[54] METHOD OF APPLYING A LUBRICATING AND FRICTION-REDUCING LAYER ON THE INNER SURFACE OF A TUBULAR BODY OF METALLIC MATERIAL

[72] Inventor: Bard Meyer Waage, Knivsta, Sweden
[73] Assignee: Habia Kommanditbolag, Knivsta, Sweden
[22] Filed: Oct. 14, 1970
[21] Appl. No.: 80,569

[30] Foreign Application Priority Data
Oct. 20, 1969 Sweden.................................14378/69

[52] U.S. Cl. ....................................................29/149.5 NM
[51] Int. Cl. ......................................B23p 11/00, B21d 53/10

[58] Field of Search ..........29/149.5 NM, 149.5 R, 149.5 PM

[56] References Cited

UNITED STATES PATENTS 3,514,831   6/1970   Bruch et al. ....................29/149.5 NM

*Primary Examiner*—Thomas H. Eager
*Attorney*—Brumbaugh, Graves, Donohue & Raymond

[57] ABSTRACT

A method for applying a lubricating and friction-reducing layer on the inner surface of a tubular metallic body comprising the steps of applying a lubricating and friction-reducing coating on the inner surface of the body and thereafter subjecting said coating to a deformation calibration by means of a bearer.

3 Claims, 3 Drawing Figures

PATENTED FEB 8 1972  3,639,960

BÅRD MEYER WAAGE
by
Brumbaugh, Graves, Donohue & Raymond
ATTYS

METHOD OF APPLYING A LUBRICATING AND FRICTION-REDUCING LAYER ON THE INNER SURFACE OF A TUBULAR BODY OF METALLIC MATERIAL

This invention refers to a method of applying a lubricating and friction-reducing layer on the inner surface of a tubular body of metallic material, a lubricating and friction-reducing coating being arranged on the inner sheath surface of the tubular body, and thereafter being subjected to a deformation calibration by means of a bearer. It may, for example, be used with advantage in the manufacture of self-lubricating bushings in combination with shaft pins on, for example, spring coils for lorries, king pins and all movable components for industrial and even marine purposes, where the static and dynamic friction is of great importance.

As is well known, in the manufacture of lorries bushings of bronze with pins or normal steel have been used for the spring coils. A considerable disadvantage with such bushings is that after being in use for some time, particularly under difficult conditions, they have a serious tendency to corrode, for example because of gravel and salt, etc., from the roads. This often causes serious damage to the shaft pins and thus a reduced lubrication ability. Because of the formation of rust such bushings must be replaced often and if this is not done in time there may be serious consequences. There are similar disadvantages when these bushings are used in other fields, for example in ships where the water constitutes a great corrosion risk. In certain cases the rust formation brought about has been so great that it has even been necessary to cut the bushing when dismantling.

Among the objects of this invention is the provision of a method whereby the arrangement of said friction-reducing and lubricating coating may be carried out with greater economy and efficiency than herebefore practiced and furthermore at the same time as the deformation calibration of the outer walls of said tubular body.

A further object of this invention is to provide a method for the manufacture of self-lubricating and corrosion-resistant bearing units consisting of two parts movable in relation to each other, such as a bushing or the like provided with a shaft pin, whereby the bearer used for deformation calibration of said coating is constituting the shaft pin in the final bushing.

The invention is described in detail as follows with reference to a preferred embodiment shown in the accompanying drawings.

Figure 2:
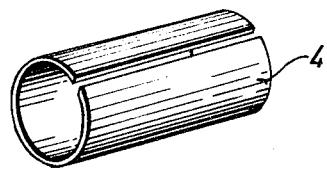
Figure 3:
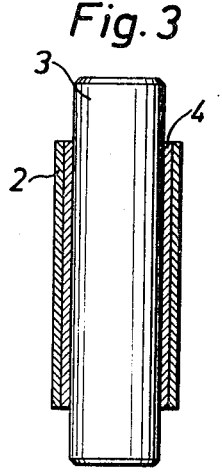

FIG. 1 shows a suitable means for performing the method proposed according to the invention, FIG. 2 shows a suitable design for the inner coating used, and FIG. 3 shows a final product consisting of a bushing and shaft pin manufactured according to the invention.

FIG. 1 shows a calibrating mandrel 1 for calibration of a metal sheath 2 by means of a bearer 3. The sheath is in this case intended to be used as a bushing, the bearer 3 comprising the finished shaft pin for the bushing. Four designates a bearing foil of plastic or some other wear-resistant material, to be applied on the inner sheath surface of the sleeve 2. Polytetrafluorethylene is particularly suitable for this purpose.

Before the sleeve 2 is placed in the calibrating mandrel 1 the inner surface of the sleeve is provided with said bearing foil 4. For this purpose the bearing foil may be coated with adhesive of curable type on the side facing the inner surface of the sleeve 2, for example an epoxy resin or the like, or the adhesive may be applied on the inner side of the sleeve. The adhesive may be precured and the final curing is then achieved in known manner by heating. The bearing foil is thus attached inside the sleeve 2.

The sleeve 2 may consist of a mass produced tubular body which can be used immediately without any special external or internal machining. The thickness of the bearing foil 4 depends on the predetermined clearance between the sleeve and the shaft pin 3 and should preferably be slightly thicker than said clearance so that a certain deformation is guaranteed to give the highest deformation under load.

In the example shown a shaft pin 3 is used as bearer which, after the calibration process, is intended to serve as shaft pin in the unit manufactured. The shaft pin 3 is coated in a manner known per se with a layer of plastic or some other wear-resistant material, suitably polytetrafluorethylene.

The tolerance between the outer diameter of the coated shaft pin 3 and the inner diameter of the sleeve 2 may be a few millimeters, suitably 2–3 mm. The calibrating mandrel 1 is provided in known manner with a slightly conical inlet opening, narrowing towards the middle of the calibrating mandrel.

For the calibration process the sleeve 2 is applied in the calibrating mandrel 1, after which the shaft pin 3 is placed down into the sleeve. The exterior of the sleeve is thus brought into contact with the calibrating mandrel so that the sleeve is deformed to the desired outer dimension and at the same time obtains an extremely accurate calibration due to a deformation of the bearing foil between the shaft pin 3 and the inside of the sleeve 2. Any excess material obtained during this deformation calibration of the bearing foil 4 is pressed out at the ends of the sleeve after the calibration and can easily be removed.

When the adhesive has been cured the shaft pin can easily be pressed out of the sleeve because of the smooth coating layer existing between the interior of the sleeve and the exterior of the shaft pin.

The product thus obtained comprises a self-lubricating bushing which is completely maintenance-free since both surfaces are coated and thus completely protected from corrosion and fitted to each other in a completely novel manner.

The method proposed according to the invention thus offers extremely accurate tolerances both with respect to the external measurements of the sleeve and also with respect to the clearance existing between the shaft pin and the inside of the sleeve.

The shaft pin may also be provided with an oil coating instead of being coated with a suitable plastic layer.

What I claim is:

1. A method of applying a lubricating and friction-reducing layer on the inner surface of a tubular metallic body comprising the steps of arranging a lubricating and friction-reducing coating on the inner sheath surface of said tubular body, subjecting said coating to a deformation calibration by means of a bearer and at the same time during said deformation calibration of said coating, subjecting the exterior of said tubular body to a calibration by means of a calibrating mandrel having a slightly smaller diameter than the outer diameter of said tubular body.

2. A method as set forth in claim 1, wherein a shaft pin coated with a layer of friction-reducing material is used as bearer.

3. A method as set forth in claims 1 and 2 for manufacturing a self-lubricating and corrosion-resistant bearing unit consisting of two parts movable in relation to each other, such as, for example a bushing or the like provided with a shaft pin, wherein said bearer used for deformation calibration of the coating material comprises the shaft pin in the final bushing.

* * * * *